(12) United States Patent
Hoshino et al.

(10) Patent No.: US 6,339,483 B1
(45) Date of Patent: Jan. 15, 2002

(54) IMAGE READING APPARATUS

(75) Inventors: Yasushi Hoshino; Yoshio Kakuta; Toshiki Fujisawa, all of Hachioji (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/151,971

(22) Filed: Sep. 11, 1998

(30) Foreign Application Priority Data

Sep. 17, 1997 (JP) .............................................. 9-251549

(51) Int. Cl.$^7$ ................................................. H04N 1/04
(52) U.S. Cl. ........................ 358/487; 358/486; 358/451; 358/452; 358/453
(58) Field of Search ................................ 358/474, 487, 358/494, 496, 497, 486; 348/96, 97

(56) References Cited

U.S. PATENT DOCUMENTS 5,394,205 A * 2/1995 Ochiai et al. ................ 353/101
5,767,989 A * 6/1998 Sakaguchi ................... 358/474

* cited by examiner

*Primary Examiner*—Cheukfan Lee
(74) *Attorney, Agent, or Firm*—Jordan B. Bierman; Bierman, Muserlian and Lucas

(57) ABSTRACT

In a film scanner, for reading an original image on a photographic film, provided with an optical system for irradiating light to the original image on the photographic film and for focusing light from the photographic film so as to form an image and photoelectically converting elements for photoelectically reading the formed image by the optical system, there is further provided an image resolution regulator to regulate image resolution of the read image in accordance with the size of the original image to be read.

15 Claims, 11 Drawing Sheets

A DRAWING SHOWING THE STRUCTURE OF THE SECOND EXAMPLE OF THE EMBODIMENT OF THIS INVENTION

A DRAWING FOR EXPLAINING THE CHANGE OF THE IMAGE MAGNIFICATION

A DRAWING SHOWING THE STRUCTURE OF THE FIRST
EXAMPLE OF THE EMBODIMENT OF THIS INVENTION

FIG. 3 A DRAWING SHOWING THE STRUCTURE OF THE SECOND EXAMPLE OF THE EMBODIMENT OF THIS INVENTION

FIG. 4 A DRAWING SHOWING THE STRUCTURE OF THE THIRD EXAMPLE OF THE EMBODIMENT OF THIS INVENTION

FIG. 5 A DRAWING SHOWING THE STRUCTURE OF THE FOURTH EXAMPLE OF THE EMBODIMENT OF THIS INVENTION

FIG. 6 A DRAWING SHOWING THE STRUCTURE OF THE FIFTH EXAMPLE OF THE EMBODIMENT OF THIS INVENTION

A DRAWING SHOWING AN EXAMPLE OF A MODE OF PRACTICE OF THE OPERATION OF THE IMAGE SIZE DETECTING-OR-SPECIFYING MEANS

AN ILLUSTRATION OF THE OPERATION OF
SPECIFYING THE AREA FOR TRIMMING

AN ILLUSTRATION OF THE CALCULATION
OF THE IMAGE RESOLUTION

IMAGE READING APPARATUS

This invention relates to an image reading apparatus which reads the information of an original document by a photoelectric conversion element.

As the apparatus for reading image information of an original, for example, it has been developed an image reading apparatus as a film scanner which reads image information memorized in a developed photographic film by a photoelectric conversion element such as a CCD through an optical system. In such an apparatus as this, the read image is converted into digital data, which enables digital image processing, hence it is expected to come into wide use in the future.

The image reading apparatus which reads an image from an original such as a developed photographic film is composed of an original setting portion wherein the original is set, an imaging optical system which reads optically the image information recorded in the original, and a photoelectric conversion element portion which converts the image information from the imaging optical system into electrical signals.

Regarding such an apparatus as this, it has been known an image reading apparatus capable of using two kinds of film (J135 and IX240) having different formats. In general, in these image reading apparatus, because the film setting position, the lens position, and the position of the photoelectric conversion element are fixed, the size of the image focused on the photoelectric conversion element becomes smaller as the size of the film format (the size of the original) becomes smaller, hence the quantity of image information is reduced because of the constant image resolution (dpi).

SUMMARY OF THE INVENTION

This invention has been made in view of the problem mentioned above, and it is an object of the invention to provide an image reading apparatus capable of reading an image with a maximum resolution at any time with the image resolution made variable in accordance with the size of the original.

Hereinafter, preferable structures to attain the above object will be described.

(1) This invention solving the above-mentioned problem is an image reading apparatus wherein the image information of an original is focused on a photoelectric conversion element through an optical system, and the image information is read by said image conversion element, said apparatus further comprising image size detecting-or-specifying means for detecting or specifying the image size to be read, and varying means of resolution of the image to be read for varying the maximum resolution of the image to be read in accordance with the output of said image size detecting-or-specifying means.

According to the structure of the paragraph (1), by detecting the format size of the original set on the original setting portion by means of the image size detecting-or-specifying means or by specifying the format size of the original by the operator using the image size detecting-or-specifying means, the format size of the original is determined, and the varying means of the resolution of the image to be read makes it possible to read the image information with a maximum resolution at any time in accordance with the determined format size of the original.

(2) The aforesaid varying means of resolution of the image to be read is a lens for re-sizing.

According to the structure of the paragraph (2), the image can be read always with a maximum resolution by driving the lens for re-sizing in accordance with the format size of the original.

(3) The aforesaid varying means of resolution of the image to be read is a single focus lens and a photoelectric conversion element which are made up in such a manner as to move for re-sizing with a predetermined relationship maintained.

According to the structure of the paragraph (3), the image can be read always with a maximum resolution in accordance with the format size of the original, because the single focus lens and the photoelectric conversion element move for re-sizing with a predetermined relationship maintained.

(4) The aforesaid varying means of resolution of the image to be read is a single focus lens and an original setting portion which are made up in such a manner as to move for re-sizing with a predetermined relationship maintained.

According to the structure of the paragraph (4), the image can be read always with a maximum resolution in accordance with the format size of the original, because the single focus lens and the original setting portion move for re-sizing with a predetermined relationship maintained.

(5) The aforesaid varying means of resolution of the image to be read is an original setting portion and a photoelectric conversion element which are made up in such a manner as to move for re-sizing with a predetermined relationship maintained.

According to the structure of the paragraph (5), the image can be read always with a maximum resolution in accordance with the format size of the original, because the original setting portion and the photoelectric conversion element move for re-sizing with a predetermined relationship maintained.

(6) The aforesaid varying means of resolution of the image to be read is made up in such a manner that there is provided an original setting portion capable of being selected stepwise and a photoelectric conversion element moves for re-sizing to make a predetermined magnification in accordance with the selected original setting portion.

According to the structure of the paragraph (6), the image can be read with a maximum resolution at any time in accordance with the format size of the original, because the single focus lens is moved for re-sizing to make a predetermined magnification in accordance with the selected original setting portion.

(7) The aforesaid varying means of the resolution of the read image is provided with an original setting portion capable of being selected stepwise, and has a structure such that the photoelectric conversion element is moved for re-sizing to make a predetermined magnification in accordance with the selected original setting portion.

According to the structure of the paragraph (7), the image can be read with a maximum resolution at any time in accordance with the format size of the original, because the photoelectric conversion element is moved for re-sizing to make a predetermined magnification in accordance with the selected original setting portion.

(8) The aforesaid image size detecting-or-specifying means detects the image size by detecting the image width in the main scanning direction focused on the photoelectric conversion element.

According to the structure of the paragraph (8), the format size of the original can be detected because the width of the image focused on the photoelectric conversion varies in accordance with the size of the original.

(9) The aforesaid image size detecting-or-specifying means specifies the area for trimming on the image surface for the image indicated on a display means.

According to the structure of the paragraph (9), a specified area of the image indicated on the display means can be denoted as the area for trimming, and the specified area for trimming can be read with a maximum resolution.

(10) The magnification for trimming is calculated according to the ratio of the length of a half of the whole image length indicated on the display means in the main scanning direction to the distance from the edge farther from the central line with regard to the main scanning direction to said central line.

According to the structure of the paragraph (10), the area for trimming can be read with a maximum resolution by calculating the magnification for trimming according to the ratio of the half length of the image in the main scanning direction to the distance from the edge farther from the central line with regard to the main scanning direction to said central line.

(11) When the aforesaid image size detecting-or-specifying means specifies the area for trimming on the display means, the maximum image resolution or the quantity of the image data is indicated on the display means in accordance with the area for trimming.

According to the structure of the paragraph (11), when the area for trimming is specified, the maximum resolution of the specified area for trimming can be calculated And indicated on the display means so that it may be easy to understand for the operator. To state it concretely, it is indicated in such a manner as "1200 dpi".

(12) When the scanning of the image wherein the area for trimming is specified on the display means is to be carried out, the start position in the sub-scanning direction and the end position in the sub-scanning direction are moved in accordance with the area for trimming.

According to the structure of the paragraph (12), in the case where the area for trimming is specified, because it is not necessary for the whole area of a frame to be subjected to proper scanning, the area for proper scanning is made to be from the start position in the sub-scanning direction to the end position in the sub-scanning direction, hence the proper scanning can be carried out efficiently.

(13) When the image in which the area for trimming is specified on the display means is indicated again on the display means after it is subjected to the scanning, the scanned and read image is indicated only to the extent subjected to trimming.

According to the structure of the paragraph (13), only the area for trimming can be indicated with a maximum resolution on the display means.

(14) The aforesaid image size detecting-or-specifying means indicates the magnification for enlargement or the size of the original on the display means.

According to the structure of the paragraph (14), the image can be read with the magnification for enlargement or the size of original that is just specified by the operator.

(15) The aforesaid image size detecting-or-specifying means detects the image size to be read by the original size detecting means provided in the original setting portion.

According to the structure of the paragraph (15), the image size to be read can be detected by providing the means for detecting the size of the original in the original setting portion.

DETAILED DESCRIPTION OF THE PREFERRED EMBODIMENT

In the following, examples of the embodiment of this invention will be explained in detail with reference to the drawings.

Figure 1:
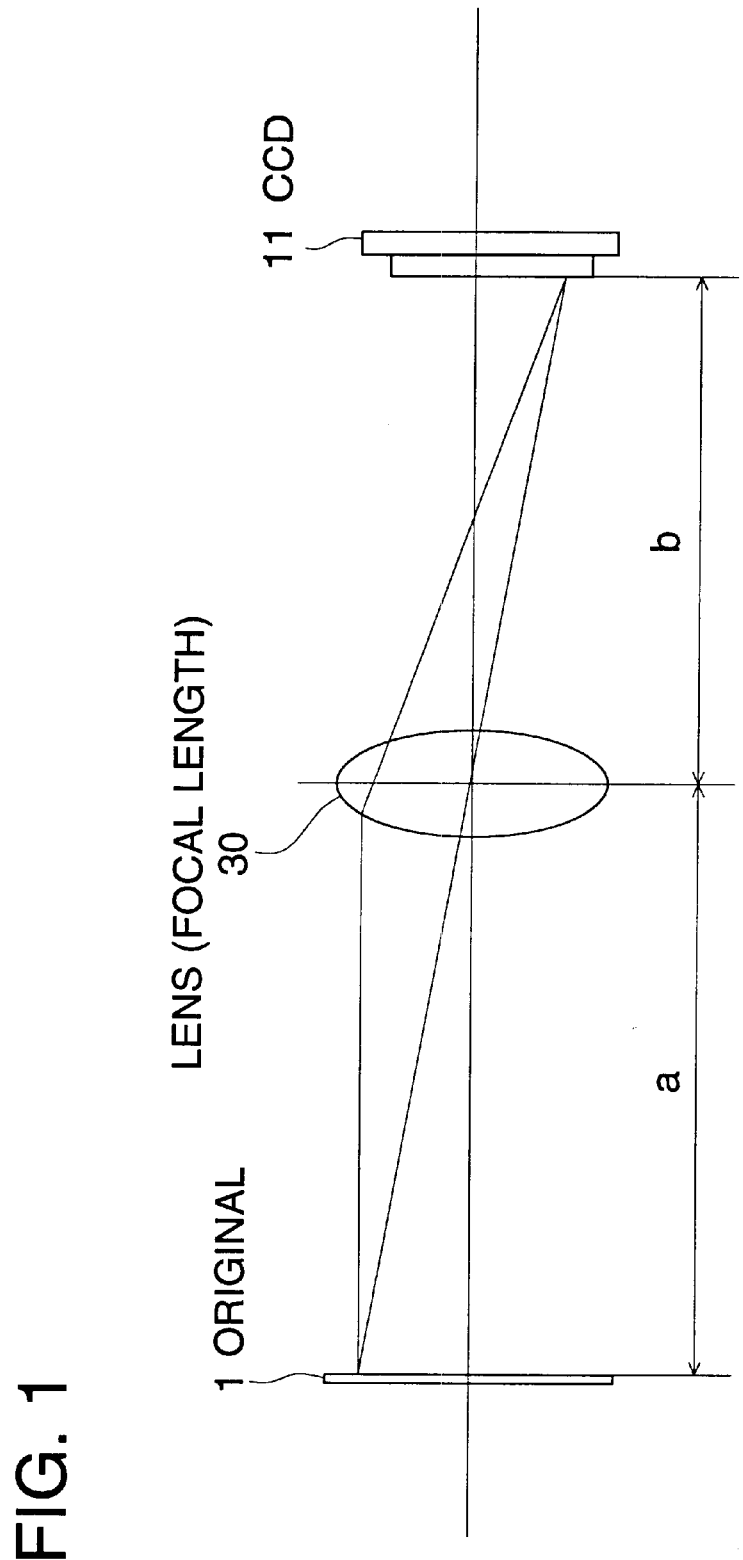
FIG. 1 is a drawing for explaining the change of image magnification.

In this example of practice, the magnification of the image focused on the photoelectric conversion element (a CCD, for example) is varied in order that the original may be read with a maximum resolution for the image to be read regardless of the size of the original. Therefore, first of all, the basic principle of the re-size operation will be explained. FIG. 1 is a drawing for explaining the change of the image magnification.

Now, let m be the image magnification, let f be the focal length of the lens, let a be the distance from the original 1 to the lens 30, and let b be the distance from the lens 30 to the CCD 11, then following equations are valid:

$$m = b/a \tag{1}$$

$$(1/a) + (1/b) = (1/f). \tag{2}$$

From the above equations, it is understood that m is a function of a, b, and f.

That is, by varying the focal length of the lens 30, f, the distance from the original 1 to the lens 30, a, or the distance from the lens 30 to the CCD 11, b, the image magnification is varied. The phrase "with the predetermined relationship maintained" in items 6, 7, and 8 means that "with the equations (1) and (2) satisfied"

Figure 2:
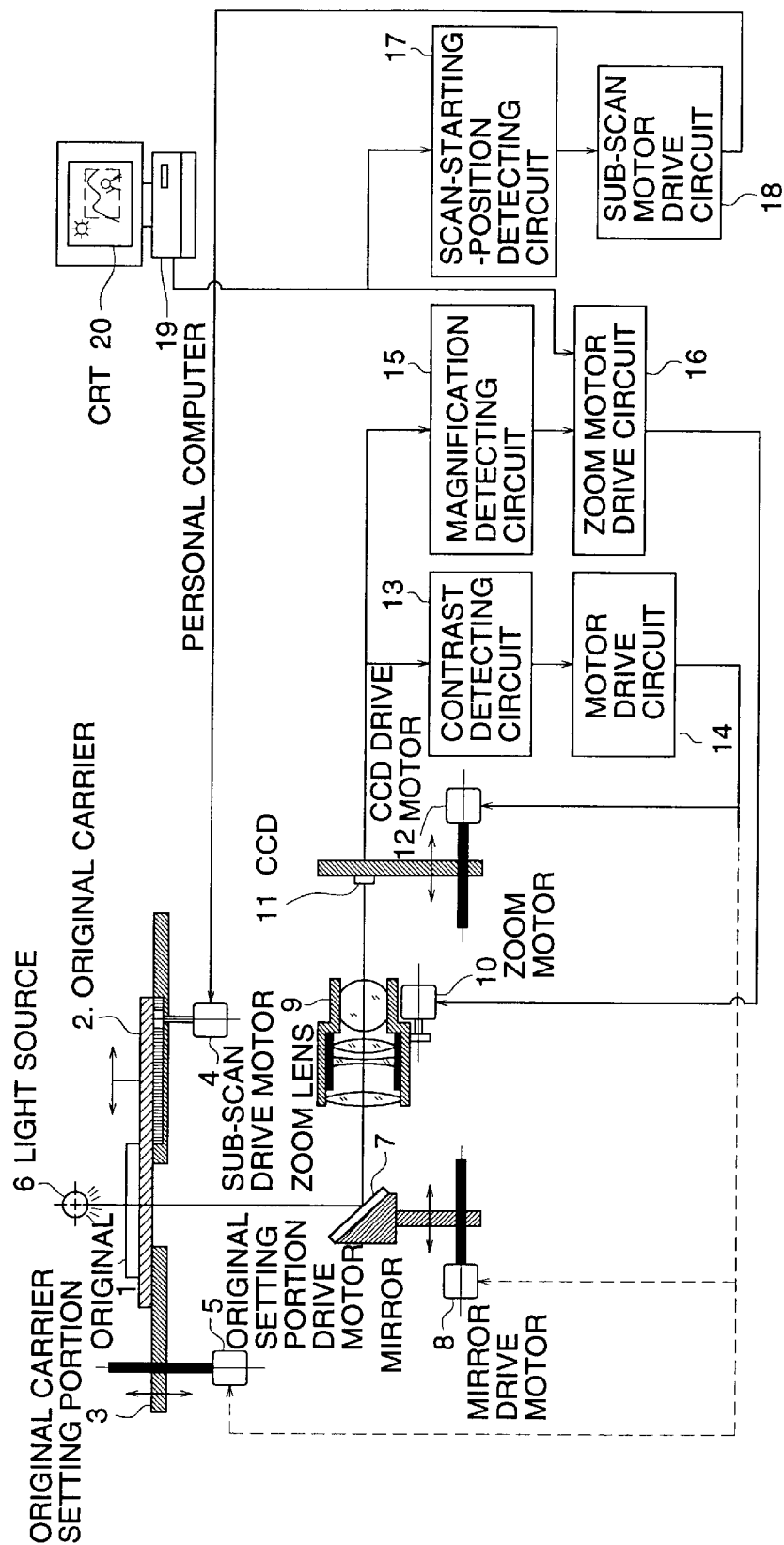
FIG. 2 is a drawing showing the structure of the first example of the embodiment of this invention.

FIG. 2 is a drawing showing the structure of an example of the embodiment of this invention, shows the case of a film scanner. In the drawing, 1 is the original, 2 is the original carrier for setting said original, and 3 is the original carrier setting portion for setting said original carrier 2. As for the original, a photographic film original is used, for example.

Further, in addition to the film scanner mainframe, the film scanner system including a personal computer and a display means may be regarded as the film scanner herein referred to, or the film scanner mainframe itself separated from the personal computer may be regarded as the film scanner herein referred to.

4 is the sub-scanning drive motor for moving the original carrier setting portion 3 in the direction of sub-scanning, and 5 is the original setting portion drive motor for moving the original carrier setting portion 3 in the up-and-downward direction. 6 is the light source for illuminating the original 1. The sub-scanning drive motor 4 is fitted with a pinion, which meshes with the rack fixed to the original carrier setting portion 3, which is made to move in the direction of sub-scanning (the direction of the arrow mark in the drawing).

7 is the mirror for receiving the light transmitted through the original 1 and deflecting the optical path, and 8 is the mirror drive motor for moving said mirror 7. 9 is the zoom lens receiving the light reflected by said mirror 7, and 10 is the zoom motor for driving said zoom lens 9. 11 is the CCD as the photoelectric conversion element receiving the transmitted light through the zoom lens 9, and 12 is the CCD drive motor for moving said CCD 11 in the direction of the arrow mark.

13 is the contrast detecting circuit for detecting the contrast from the electrical signal detected by the CCD 11, and 14 is the motor drive circuit for driving each of the aforesaid motors in response to the output of said contrast detecting circuit 13. 15 is the magnification detecting circuit for receiving the output of said CCD 11 to detect the magnification, and 16 is the zoom motor drive circuit for receiving the output of said magnification detecting circuit 15 to drive the zoom motor 10. The contrast signal and the magnification signal are detected as the output from the CCD 11, and at the time of proper scanning, the output of the CCD 11 is transmitted to the image-processing portion.

17 is the scan-starting position detecting circuit for detecting the position of scan-starting for the original 1, and 18 is the sub-scan motor drive circuit for receiving said scan-starting position detecting circuit 17 to drive the sub-scanning drive motor 4. 19 is the personal computer (hereinafter abbreviated as PC) for controlling the total operation, and 20 is the CRT as a display means attached to said PC 19 indicating the image information having been read, other commands, and so forth. From the PC 19, instructions are made to be given to the zoom motor drive circuit 16. Further, broken lines (hereinafter shown in the same manner) show the signals which do not directly relate to the explanation of the example of the embodiment. The operation of the circuit made up in this way will be explained in the following.

In the following, the basic operation of the apparatus of this invention with reference to FIG. 2 will be explained. First, the original 1 to be scanned is set on the original carrier 2, which is then set on the original carrier setting portion 3. The original 1 is set in a manner such that the center of the original in the direction of its width comes to the center of the width in the main scanning direction on the original carrier 2.

Next, the PC 19 detects the magnification for enlargement by the image size detecting-or-specifying means, or specifies the magnification for enlargement. Then the PC 19 establishes the magnification for enlargement by the varying means of the resolution of the image to be read on the basis of the detected or specified magnification for enlargement. Further, the PC 19 carries out the pre-scan on the basis of the image size obtained by the image size detecting-or-specifying means, and indicates the result on the CRT 20.

Further, as for the image size detecting means, the one which detects the image size by detecting the width of the image in the main scanning direction focused on the photoelectric conversion element such as a CCD, or the one which is provided in the original setting portion and detects the image size of the original set on the aforesaid original setting portion utilizing the infrared ray, visible light, or pressure can be employed. Moreover, it may also be employed an image size detecting means which detects the image size in such a manner that a plurality of original setting portions are provided and it is detected on which one of the original setting portions the original is set.

In addition, on the occasion of specifying the image size, it may be done in a manner such that the original size itself or the magnification for enlargement is specified on the basis of the information or instruction indicated on the display of a PC etc. using a keyboard or a mouse. Further, it may also be appropriate to employ a method such that the image size can be specified by specifying the area for trimming on the display means. In this case, the keyboard or the mouse can be regarded as a part of the image size specifying means, and also the CPU and the circuits etc. provided in the film scanner mainframe for specifying the image size on the basis of the instruction from the PC can be regarded as a part of the image size specifying means. Moreover, it may be employed a method such that the image size is specified by inputting the data from an inputting portion provided in the film scanner mainframe composed of a button and a switch etc.

Next, the contrast signal from the CCD 11 is detected by the contrast detecting circuit 13, and it is checked that the contrast signal is larger than the standard value. For example, it is checked that the signal has a spatial frequency response value larger than 30 lp/mm.

If the signal has a spatial frequency response value lower than the standard, the motor drive circuit 14 drives the CCD drive motor 12 to move the CCD 11, or motor drive circuit 14 drives mirror drive motor 8 to move the mirror 7, or the original setting portion drive motor 5 moves the original carrier setting portion 3 to a minute distance in the direction of the optical path driven by the motor drive circuit 14, and it is checked again that the contrast signal is over the standard. However, in case of moving the mirror, it is required that the scan-starting position is corrected (to be described later).

The above-mentioned operation for the case where the signal is under the standard is repeated until the contrast signal comes into the standard range. The PC 19 drives the sub-scan drive motor 4 to move the original carrier to the scan-starting position, from which it moves the original carrier 2 slowly and continuously to read the whole image information of one frame and the image is indicated on the CRT 20 (proper scan).

In this manner, according to this invention, it determines the format size of the original that the image size detecting-or-specifying means detects the format size of the original set on the original setting portion, or the operator specifies the format size of the original by the image size detecting-or-specifying means, and, in accordance with the determined format size of the original, the varying means of the resolution of the image to be read can always read the image information with a maximum resolution.

In the following, the actual operation of the image reading apparatus shown in FIG. 2 will be explained. In this example of the embodiment, it is shown a case where a zoom lens is used for the varying means of resolution of the image to be read. 9 shown in the drawing is the zoom lens. 10 is the zoom motor for driving the zoom lens to move, and is driven by the zoom motor drive circuit 16. In addition, in place of the zoom lens, some other lens for re-sizing may be employed so long as it is capable of varying the focal length for re-sizing.

First, the zoom motor drive circuit 16 drives the zoom motor 10 to set the zoom lens to the wide angle position (low magnification position). Next, the original 1 is illuminated by the light source 6 and the transmitted light is reflected by the mirror 7 and is focused on the CCD 11 through the zoom lens 9 of the imaging optical system. Then the zoom motor 10 is driven by the zoom motor drive circuit 16 to make it come to the position corresponding to the magnification obtained from the image size detecting-or-specifying means for the re-sizing operation of the zoom lens 9.

According to this example of the embodiment, the zoom lens 9 is driven in accordance with the format size of the original 1, so that the image can be read always with a maximum resolution.

Figure 3:
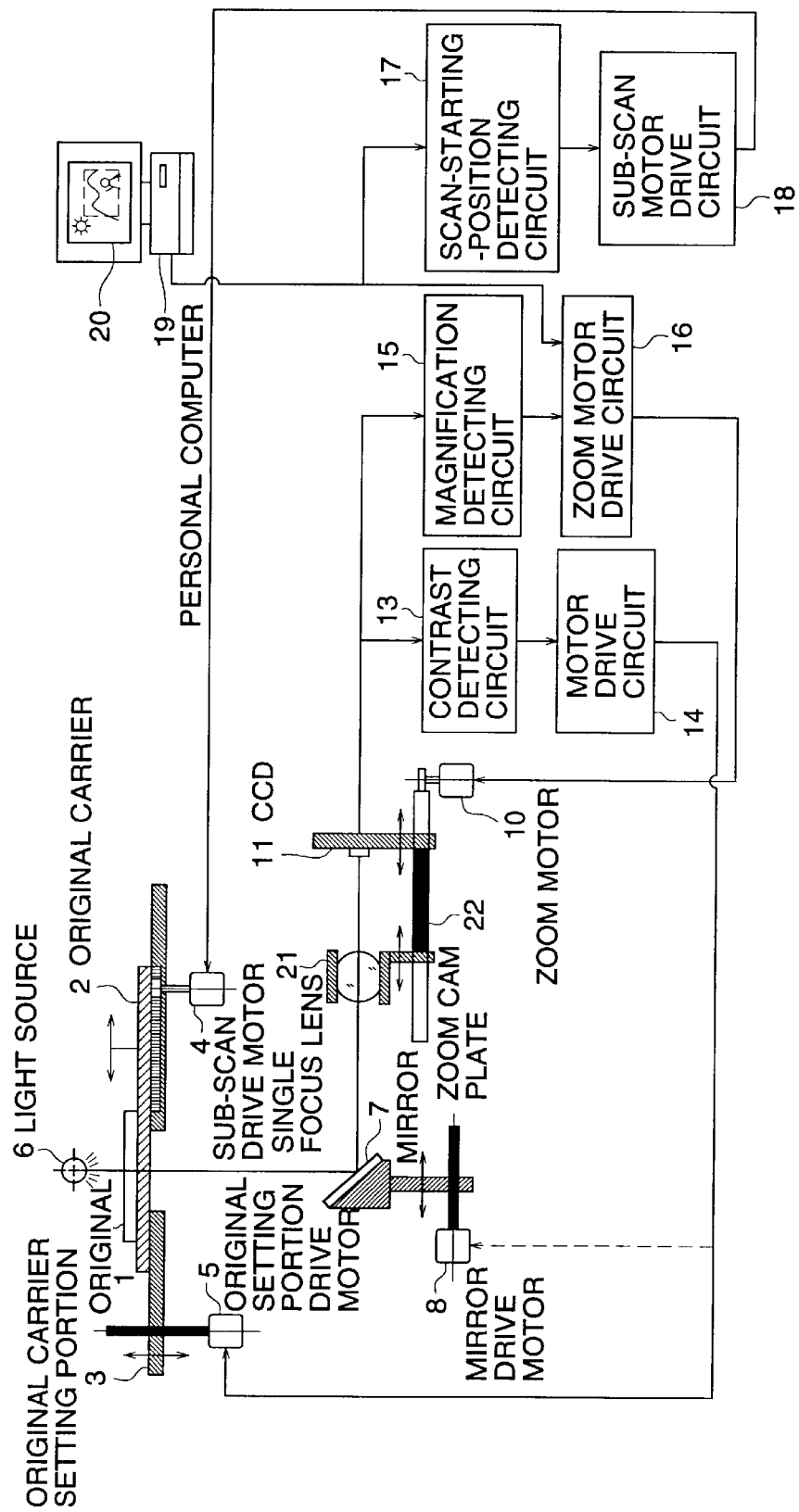
FIG. 3 is a drawing showing the structure of the second example of the embodiment of this invention.

FIG. 3 is a drawing showing the structure of the second example of the embodiment of this invention. The items equivalent to those in FIG. 2 are shown with the same signs put to them as in FIG. 2. In this example of the embodiment, as the varying means of the image resolution, a single focus lens, not the zoom lens, is employed and said zoom lens and the CCD is connected with a cam plate, and both the single focus lens and the CCD are unitedly moved by the zoom motor 10.

In the drawing, 21 is the single focus lens, and 22 is the zoom cam plate connecting said single focus lens 21 and the CCD 11 unitedly. Further, the zoom motor 10 is driven by the zoom motor drive circuit 16. The explanation of the operation of the apparatus made up in the above-mentioned manner will be as follows.

First, the zoom motor 10 is driven by the zoom motor drive circuit 16 to set the single focus lens 21 and the CCD 11 to the wide angle position (low magnification position). Next, the original 1 is illuminated by the light source 6, and the transmitted light is reflected by the mirror 7 and is focused on the CCD 11 through the single focus lens 21 of the imaging optical system. Then the zoom motor 10 is driven by the zoom motor drive circuit 16 to move the single focus lens 21 and the CCD 11, in order that they may come to the position corresponding to the magnification obtained from the image size detecting-or-specifying means.

According to this example of the embodiment, the image can be read always with a maximum resolution in accordance with the format size of the original 1, because the single focus lens 21 and the CCD 11 moves for re-sizing with the predetermined relationship maintained.

Figure 4:
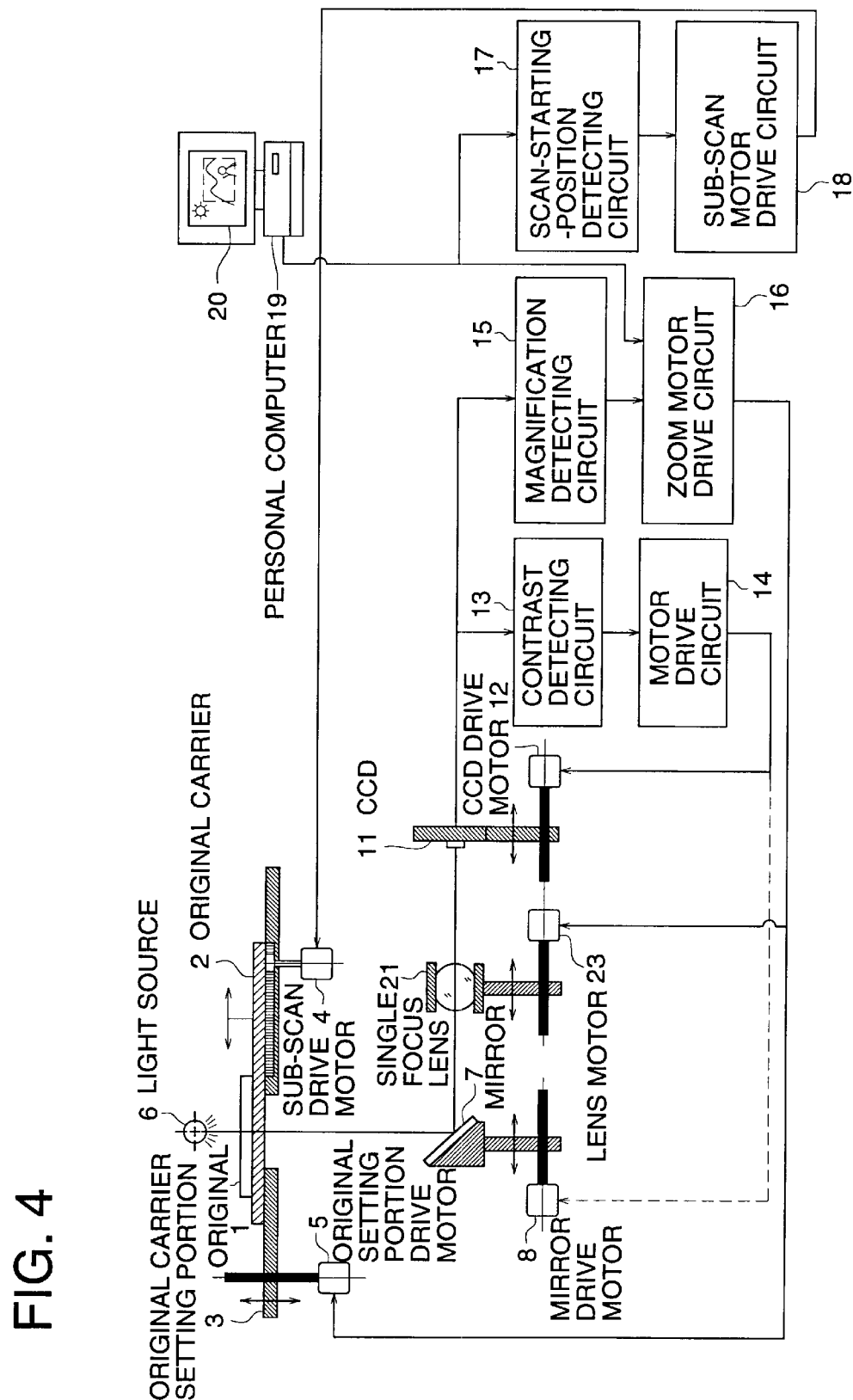
FIG. 4 is a drawing showing the structure of the third example of the embodiment of this invention.

FIG. 4 is a drawing showing the structure of the third embodiment of this invention. The items equivalent to those in FIG. 2 and FIG. 3 are shown with the same signs put to them as in FIG. 2 and FIG. 3. In this example of the embodiment, the single focus lens 21 and the CCD 11 as the image resolution varying means are independently disposed so that they are driven by the lens motor 23 and by the CCD drive motor 13 respectively. Further, the lens motor 23 and the original setting portion drive motor 5 are driven in common by the zoom motor drive circuit 16. The explanation of the operation of the apparatus made up in this manner will be as follows.

First, the lens motor 23 and the original setting portion drive motor 5 are driven by the zoom motor drive circuit 16 to set the single focus lens 21 and the original carrier setting portion 3 to the wide angle positions (low magnification positions). Next, the original 1 is illuminated by the light source 6, and the transmitted light is reflected by the mirror 7 and is focused on the CCD through the single focus lens 21 of the imaging optical system.

Further, the zoom motor drive circuit drives the original setting portion drive motor 5 as well as the lens motor 23 to move the original carrier setting portion 3 and the single focus lens 21 in order that they come to the positions corresponding to the magnification obtained from the image size detecting-or-specifying means.

According to this example of the embodiment, the image can be read always with a maximum resolution in accordance with the format size of the original 1, because the single focus lens 21 and the CCD 11 moves for re-sizing with the predetermined relationship maintained.

Figure 5:
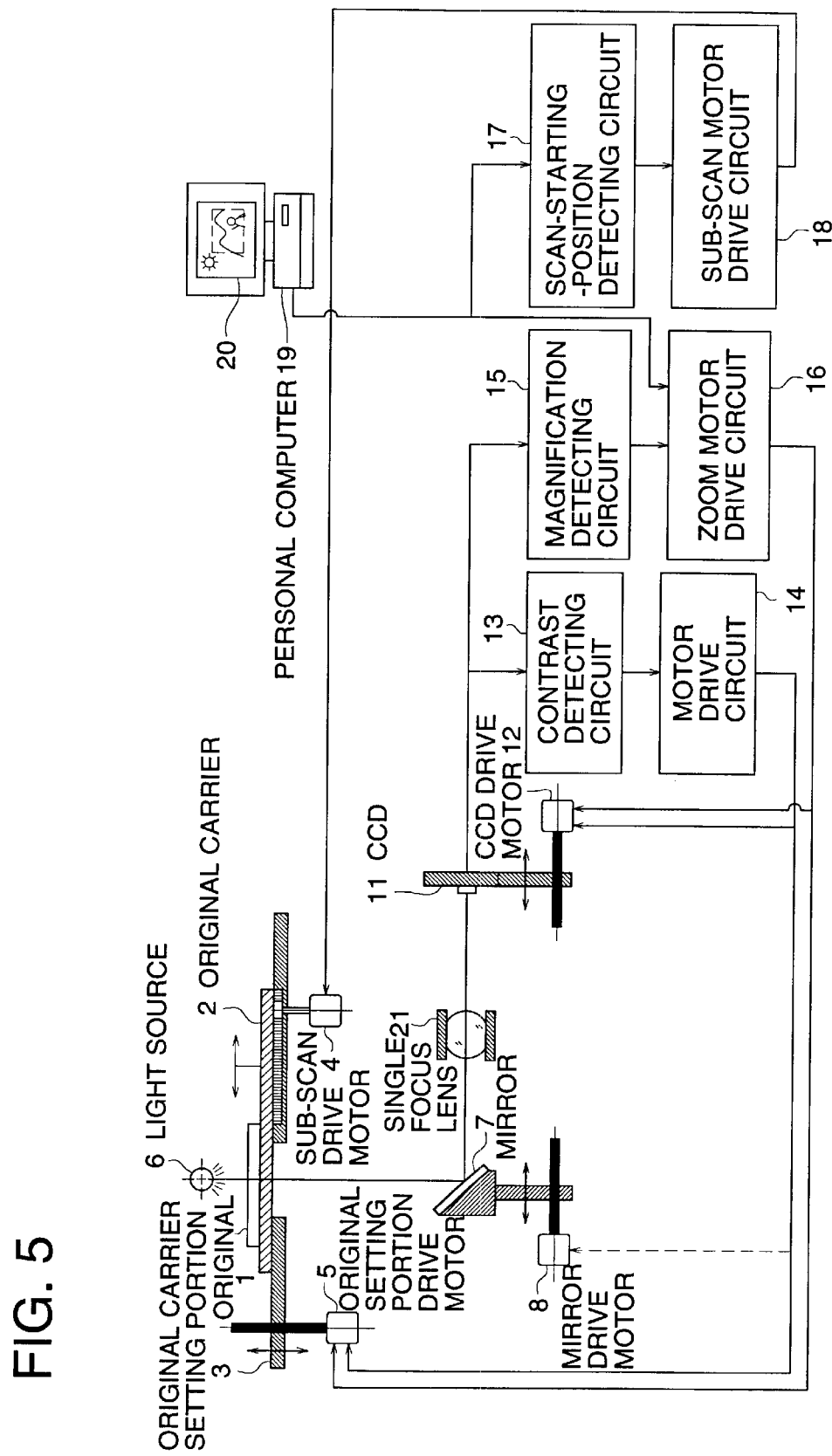
FIG. 5 is a drawing showing the structure of the fourth example of the embodiment of this invention.

FIG. 5 is a drawing showing the structure of the fourth embodiment of this invention. The items equivalent to those in FIG. 4 are shown with the same signs as in FIG. 4. The same signs are put to show the items equivalent to those in FIG. 4. In this example of the embodiment, the position of the single focus lens 21 is fixed. Further, the image resolution varying means is made up in a manner such that the original carrier setting portion 3 and the CCD 11 are moved for re-sizing with the predetermined relationship maintained, driven by the original setting portion drive motor 5 and the CCD drive motor 12 respectively, which receive the drive signals from the motor drive circuit 14 and the zoom motor drive circuit 16 respectively. The explanation of the operation of the apparatus made up in the above-mentioned manner is as follows.

First, the original carrier setting portion 3 and the CCD 11 are driven by the original setting portion drive motor 5 and the CCD drive motor 12 respectively to set them to the wide-angle positions (low magnification positions). Next, the original 1 is illuminated by the light source 6, and the transmitted light is reflected by the mirror 7 and is focused on the CCD 11 through the single focus lens 21 of the imaging optical system. After that, the image size is determined by the image size detecting-or-specifying. For example, the image size may be determined by receiving the output of the CCD 11 at the magnification detecting circuit 15, or it may be specified by the PC 19.

This image size is inputted to the zoom motor drive circuit 16, which drives the original setting portion drive motor 5 and the CCD drive motor 12 to move them to a large extent for re-sizing. Next, the adjustment of the focus as is mentioned before is carried out if necessary by the contrast detecting circuit 13 which receives the output of the CCD 11.

According to this example of the embodiment, the image can be read always with a maximum resolution in accordance with the format size of the original 1, because the original carrier setting portion 3 and the CCD 11 moves for re-sizing with the predetermined relationship maintained.

Figure 6:
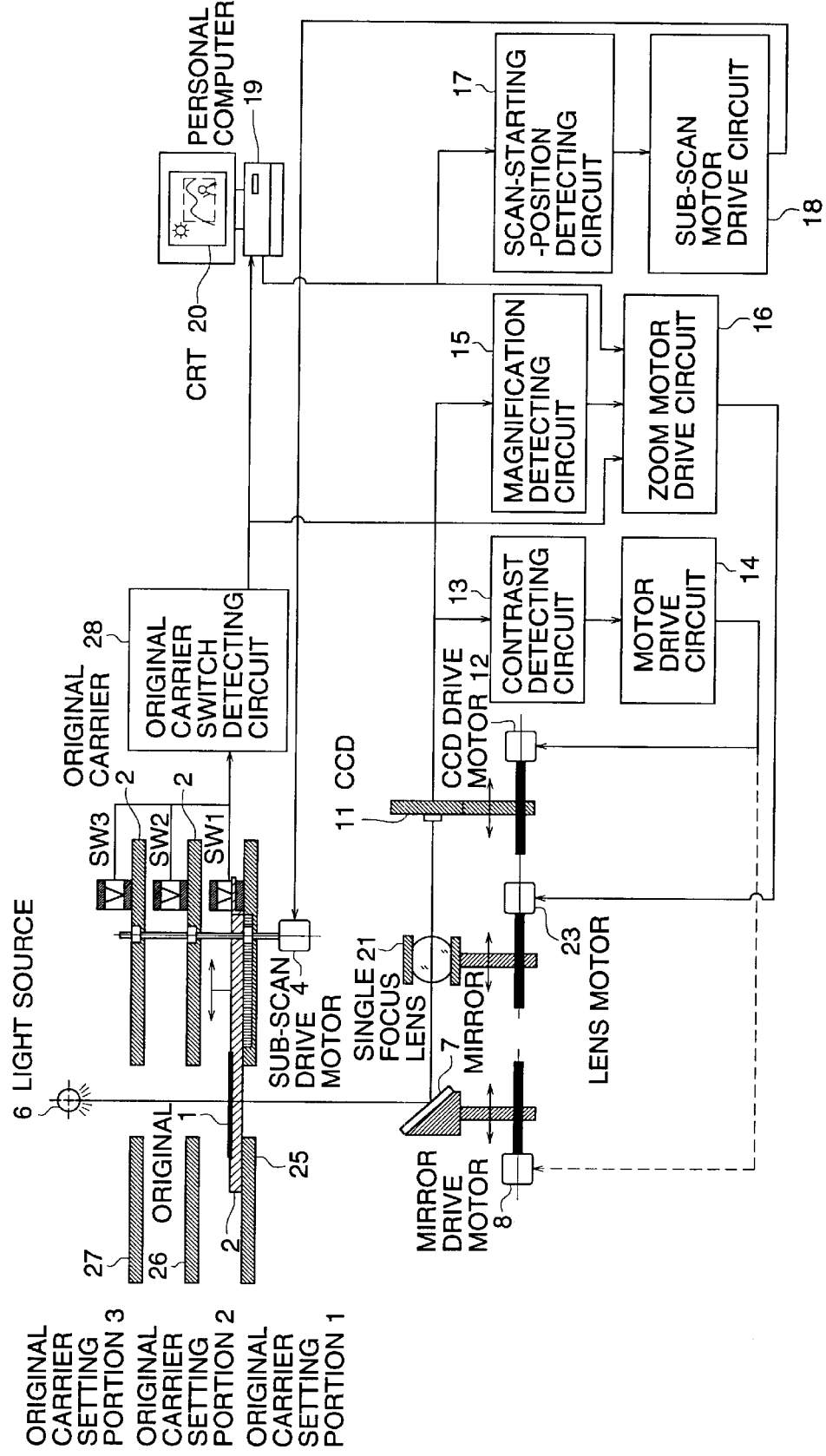
FIG. 6 is a drawing showing the structure of the fifth example of the embodiment of this invention.

FIG. 6 is a drawing showing the structure of the fifth embodiment of this invention. The items equivalent to those in FIG. 4 are shown with the same signs as in FIG. 4.

The example of the embodiment shown in the drawing is provided with an original carrier setting portion capable of being selected stepwise. In the drawing, 25 is the first original carrier setting portion, 26 is the second original carrier setting portion, and 27 is the third original carrier setting portion. On the first original carrier setting portion 25, an ASP film (IX-240 film), for example, is set, on the second original carrier setting portion 26, a J135 film, for example, is set, and on the third original carrier setting portion 27, a brownie film is set.

SW1 is the switch for detecting that the J135 film is set, SW2 is the switch for detecting that the ASP film is set, and SW3 is the switch for detecting that the brownie size film is set. For these switches SW1 through SW3, micro-switches etc. are used, for example.

28 is the original carrier switch detecting circuit which receives the detect signal and detects which of the original carriers are set, and its output is given to the PC 19 and the zoom motor drive circuit 16. In the example of the embodiment shown in the drawing, the sub-scan drive motor 4 moves the original carrier setting portion in the direction of sub-scanning. Further, in this example of the embodiment, the mirror 7, the single focus lens 21, and the CCD 11 are provided with the drive motors 8, 23, and 12 respectively, so that these mirror 7, single focus lens 21, and CCD 11 may be moved to the direction of the arrow mark. The explanation of the operation of the apparatus made up in the above-mentioned manner is as follows.

First, the original 1 is set on the original carrier 2 corresponding to the original size. For example, the original (film) 1 is discriminated to be set to the original setting portion corresponding to each of the J135 film, the APS film, and the brownie film.

The original carrier switch detecting circuit 28 discriminates the original size by the inputted contact signal from any one of the switches SW1 through SW3, and lets the PC 19 and the zoom motor drive circuit to be informed of it. Further, according to the result of detecting, the original carrier switch detecting circuit 28 drives the lens motor 23 by the zoom motor drive circuit 16 to move the single focus lens 21 in order to make the original 1, the single focus lens 21, and the CCD 11 become in the predetermined relationship. In this state, the original is illuminated by the light source 6, and the transmitted light is reflected by the mirror 7 and is focused on the CCD 11 through the single focus lens 21 of the imaging optical system.

According to this structure of the invention, the image can be read always with a maximum resolution in accordance with the format size of the original, because the single focus lens 21 moves for re-sizing to make the predetermined magnification in accordance with the selected original carrier setting portion.

Figure 7:
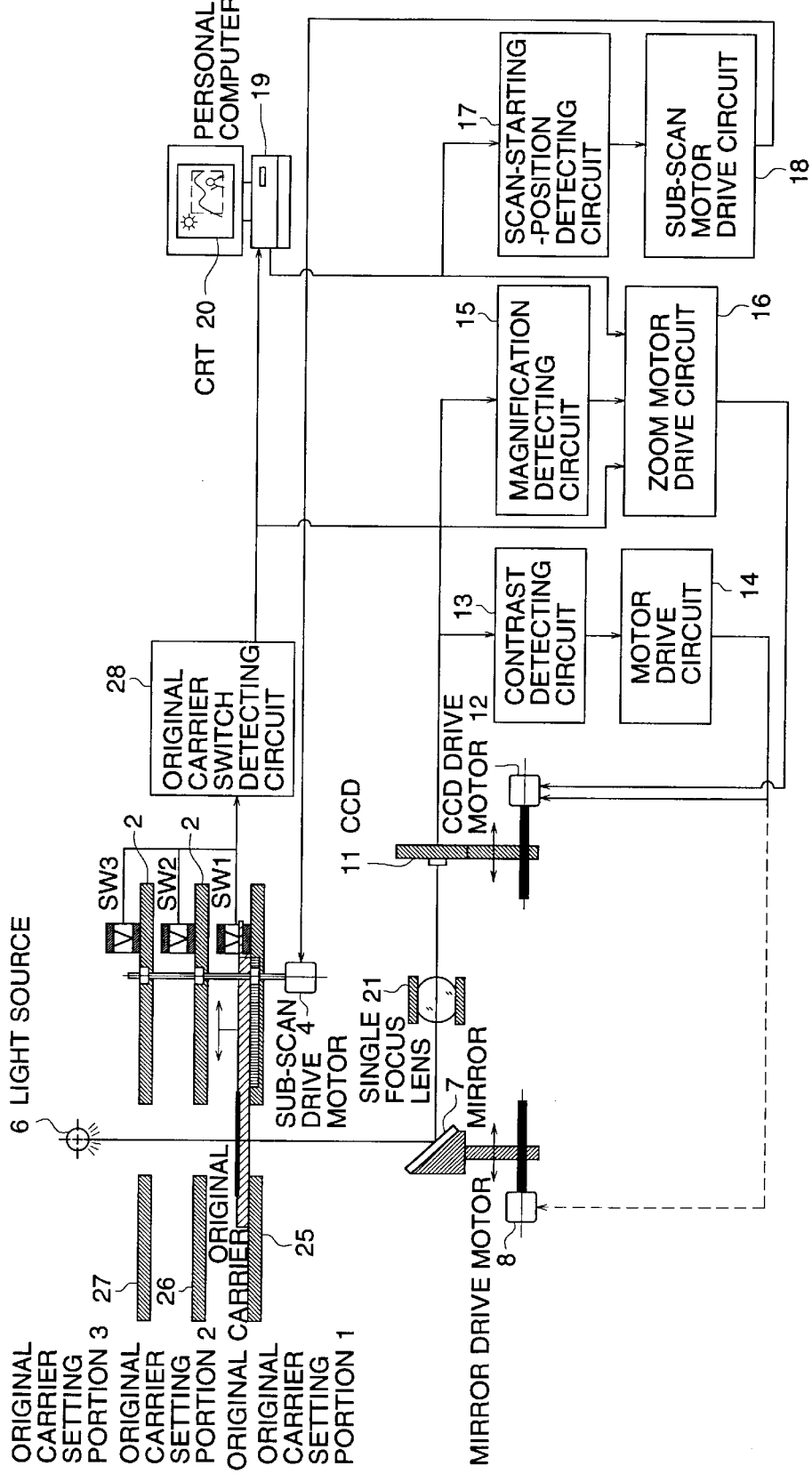
FIG. 7 is a drawing showing the structure of the sixth example of the embodiment of this invention.

FIG. 7 is a drawing showing the structure of the sixth example of the embodiment of this invention. The items equivalent to those in FIG. 6 are shown with the same signs put to them as in FIG. 6. In this example of the embodiment, the single focus lens 21 is fixed and the mirror 7 and the CCD 11 are provided with the drive motors 8 and 12 respectively, so that these mirror 7 and CCD 11 can be moved in the direction of the arrow mark. Further, the outputs of the motor drive circuit 14 and the zoom motor drive circuit 16 are inputted to the CCD drive motor 12 to drive it. The other structure is the same as that shown in FIG. 6. The explanation of the operation of the apparatus made up in this manner is as follows.

First, the original 1 is set on the original carrier 2 corresponding to the size of the original. For example, the original (film) 1 is discriminated to be set to the original setting portion corresponding to each of the J135 film, the APS film, and the brownie size film.

The original carrier switch detecting circuit 28 discriminates the original size by the inputted contact signal from any one of the switches SW1 through SW3, and lets the PC 19 and the zoom motor drive circuit be informed of it. Further, according to the result of detecting, the original carrier switch detecting circuit 28 drives the lens motor 23 by the zoom motor drive circuit 16 to move the CCD 11 in order to make the original 1, the single focus lens 21, and the CCD 11 become in the predetermined relationship. In this state, the original is illuminated by the light source 6, and the transmitted light is reflected by the mirror 7 and is focused on the CCD 11 through the single focus lens 21 of the imaging optical system. Next, the adjustment of the focus as is mentioned before is carried out if necessary by the contrast detecting circuit 13 which receives the output of the CCD 11 by controlling the motor drive circuit 14 to rotate the CCD drive motor to a minute amount.

According to this structure of the invention, the image can be read always with a maximum resolution in accordance with the format size of the original, because the CCD 11 moves for re-sizing to make the predetermined magnification in accordance with the selected original carrier setting portion.

Figure 8:
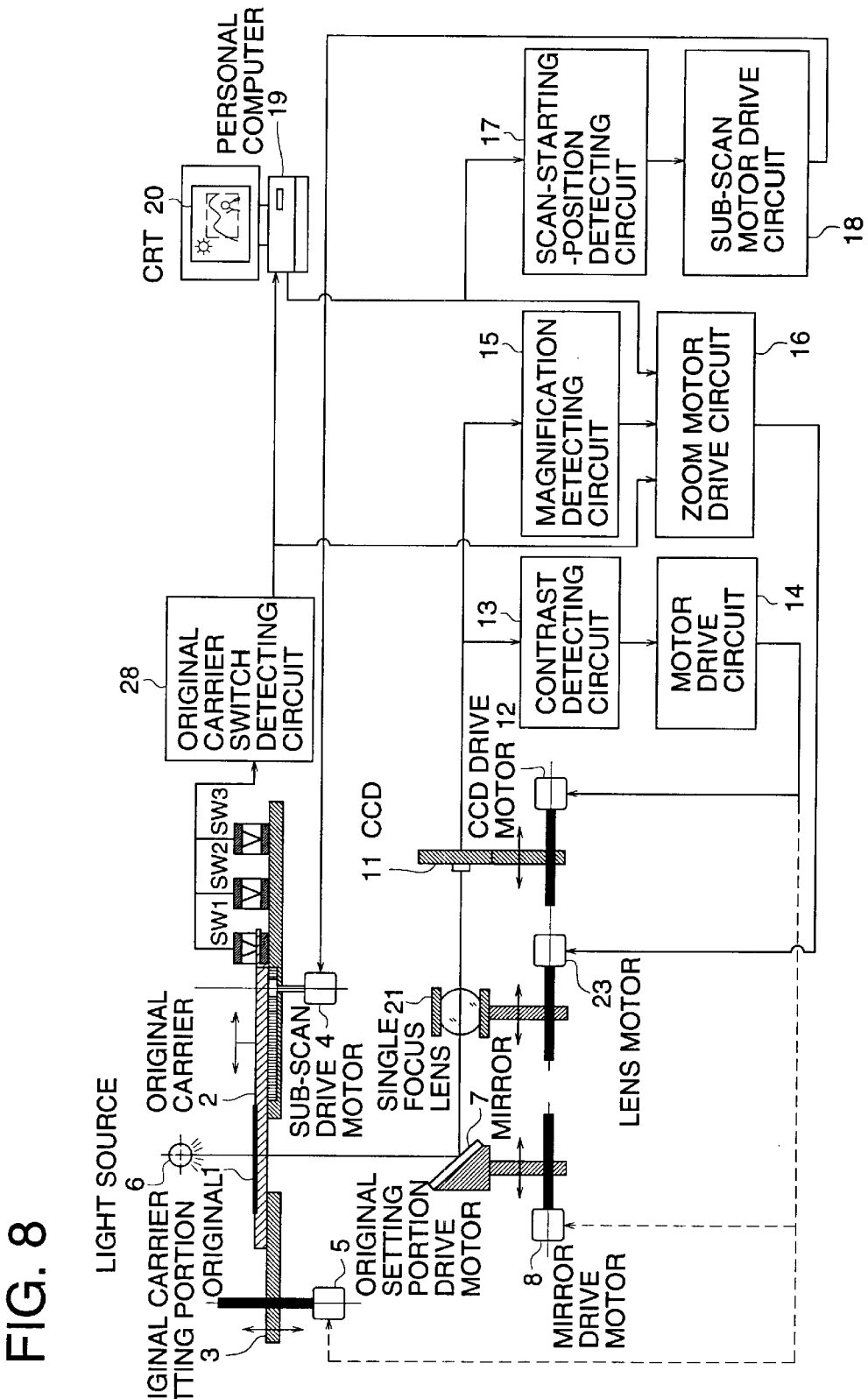
FIG. 8 is a drawing showing the structure of the seventh example of the embodiment of this invention.

FIG. 8 is a drawing showing the structure of the seventh example of the embodiment of this invention. The items equivalent to those in FIG. 1 and FIG. 6 are shown with the same signs put to them as in FIG. 1 and FIG. 6. In this example of the embodiment, the film original is set not on the original carrier setting portion with multiple formats but the original carrier 2 is set on the original carrier setting portion 3 of one stage, so that the original size may be discriminated automatically using switches etc.

In the drawing, SW1 through SW3 are the switches each detecting the each of the sizes of the original. These switches detect any one of the length, the width, and the thickness of the original carrier 2 for each kind of the original. 28 is the original carrier switch detecting circuit which receives the outputs of these switches SW1 through SW3 and detects which one of the switches is made on, and its output is given to the PC 19 and the zoom motor drive circuit 16. These switches are appropriate so long as they can detect any one of the length, width, and thickness of the original carrier for each kind of the original. The following are the explanation of the operation of the apparatus made up in this manner is as follows.

When a given original is set on the original carrier setting portion 3 together with the original carrier 2, any one of the switches SW1 through SW3 becomes on. The contact signal of any one of these switches SW1 through SW3 is transmitted to the PC 19 and the zoom motor drive circuit 16. Owing to this, because it is now definite that the size of the original has been discriminated, the magnification corresponding to the size of the original is given to the PC 19 and the zoom motor drive circuit 16, and the latter drives the lens motor 23 to move the single focus lens 21 so that the predetermined magnification may be obtained.

After that, the original is illuminated by the light source 6, and the transmitted light is reflected by the mirror 7 and is focused on the CCD 11 through the single focus lens 21 of the imaging optical system. In this example of the embodiment, it is taken for instance the case where the switches SW1 through SW3 are used as the original size detecting means for detecting the size of the original, however, the invention should not be confined to this example. For example, a different number of holes are bored in the original carriers in such a manner as, for example, one for the APS film, two for the J135 film, and three for the brownie size film. Thus, the size of the original can be detected by detecting this number of holes too.

According to this example of the embodiment, the size of the original to be read can be automatically detected by providing means for detecting the size of the original in the original carrier setting portion 3.

Figure 9:
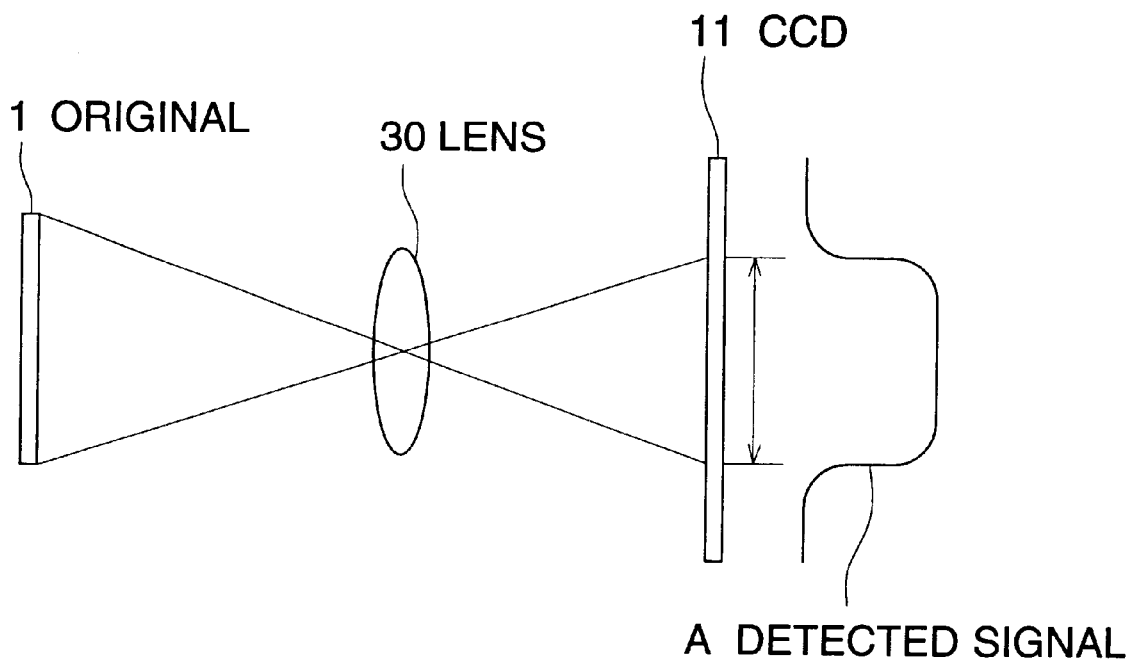
FIG. 9 is a drawing showing an example of a mode of practice of the operation of the image size detecting-or-specifying means.

In the following, the automatic detecting of the image size by the image size detecting-or-specifying means and the manual operation for specifying the image size will be explained. FIG. 9 is a drawing showing an example of practice for the operation of the image size detecting-or-specifying means as the automatic detecting of the image size. In the drawing, 1 is the original (film for example), 30 is the lens receiving the transmitted light from said original 1 to converge it, and 11 is the CCD on which the image is focused by the lens 30. As for the lens 30, the above-mentioned zoom lens 9 or single focus lens 21 is employed.

The transmitted light from the original 1 is converged and focused on the CCD 11. The width of the focused image L in the direction of main scanning in this case varies in accordance with the kind of the original. The output signal of the CCD 11 is such as shown in A of FIG. 9. Now, by measuring the width of the output signal of the CCD 11, it is found out whether the original 1 is a J135 film, an APS film, or a brownie film.

That is, L becomes the minimum in the case of an ASP film, next the L of J135 film is larger than that in the case of the ASP film, and the L of the brownie film is the largest. The output of the CCD 11 is transmitted to the PC 19 through the image processing portion (not shown in the drawing), hence the PC 19 can discriminate the size of the original. By knowing the size of the original, the PC 19 calculates the magnification to make the detected width of the image of the original in the direction of main scanning, which enables the reading of the image information in full scale.

As is explained up to now, according to this example of the embodiment, the image size of the original can be automatically detected because the width of the image focused on the CCD 11 varies in accordance with the size of the original.

Figure 10:
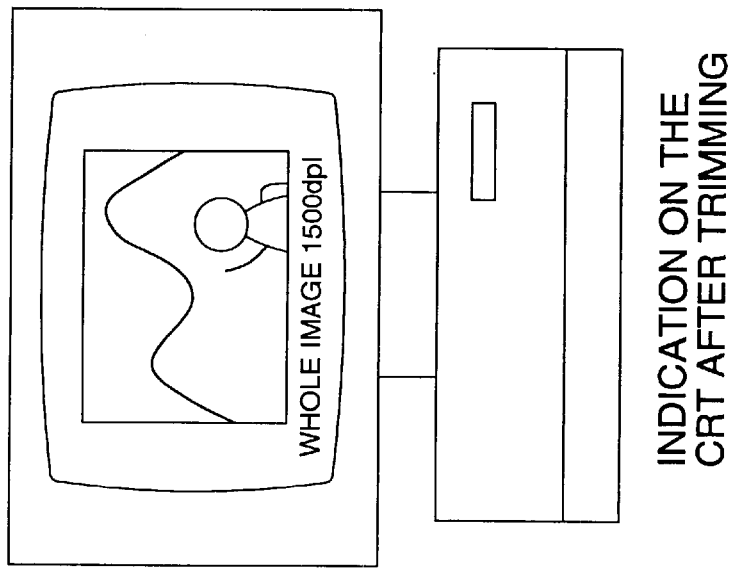
FIGS. 10($a$) and 10($b$) are illustrations of the operation of specifying the area for trimming.
Figure 10:
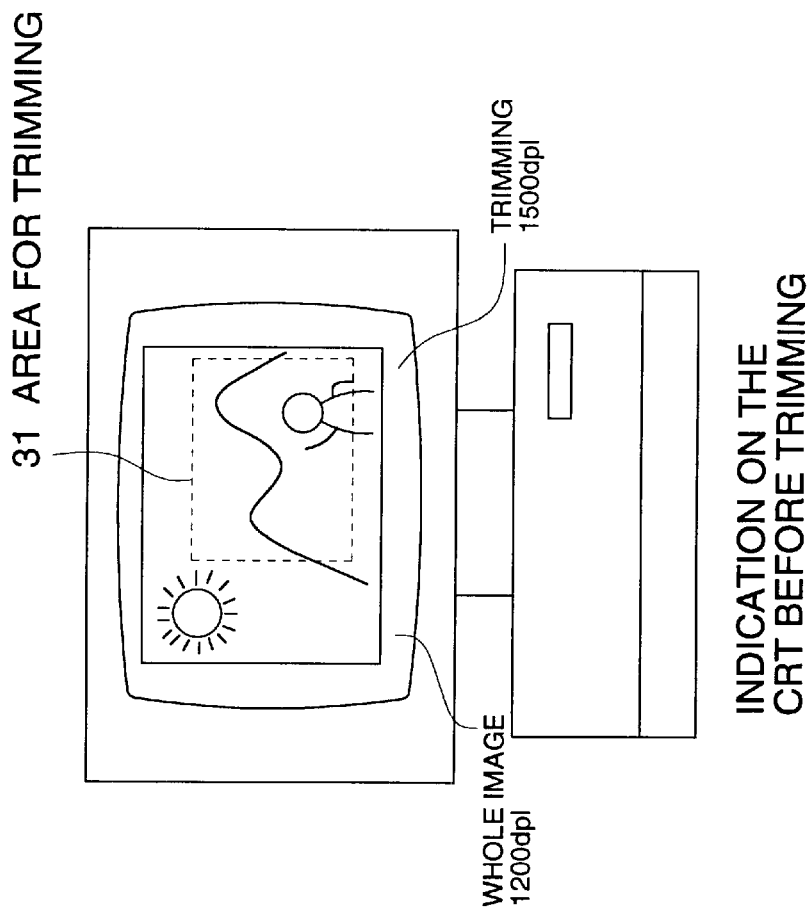

In the following, the trimming area specifying process on the original image will be explained as an example of practice for manually specifying the image size. FIG. 10 is an illustration of the operation of specifying the area for trimming.

First, the optical system is set at the wide-angle position (low magnification position), and the image is indicated on the CRT by pre-scanning. FIG. 10(a) is the image indicated by pre-scanning. Suppose that the resolution of this whole image is 1200 dpi as is indicated in the CRT 20. The operator specifies the area for trimming with a mouse cursor, for example, in such a manner as is shown in FIG. 10(a). The area 31 shown by the broken line of (a) is the area to be trimmed.

According to this example of the embodiment, any particular area of the image indicated on the CRT can be specified for trimming, and the specified area for trimming can be read with a maximum resolution.

Regarding the specifying of the trimming area, the center trimming wherein trimming is made for the same length above and below the central line of the image frame and the trimming wherein an area, which is biased to one side, is specified can be considered. In the former case, an image balanced for the upper and lower area with regard to the center of the image frame can be indicated on the CRT by proper scanning.

As is shown in (a), in the case of the biased trimming, the width of proper scanning is determined in the following manner. That is, the resolution of the image is calculated by the ratio of half the length of the whole image, to which the instruction for trimming is issued, in the main scanning direction, to the distance from the central line of the frame in the main scanning direction to the farther edge from said central line, and the value of the resolution of the image is indicated on the CRT. The numerical value 1500 dpi in the drawing (a) is the resolution for this case.

Figure 11:
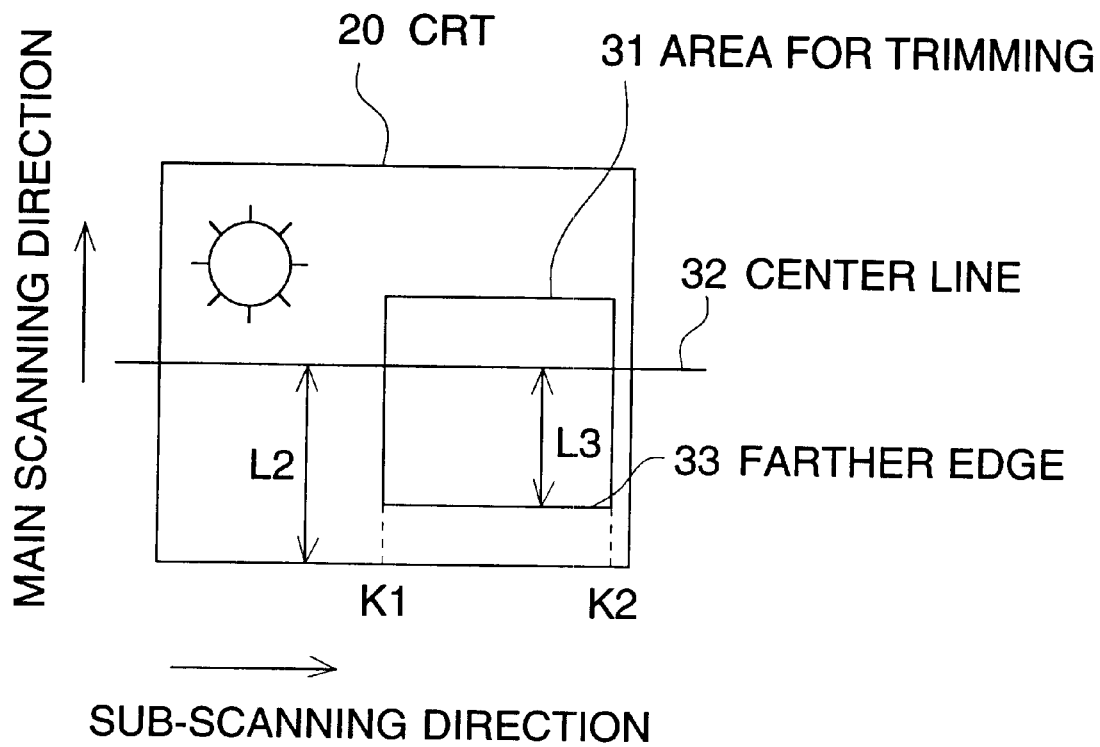
FIG. 11 is an illustration of the calculation of the image resolution.

FIG. 11 is an illustration of the calculation of the image resolution. Suppose that the area for trimming is determined in a manner as shown in the drawing. In this case, let 32 be the center (central line) of the CRT frame, and let L2 be the half-length of the image frame in the main scanning direction. In the biased area for trimming 31, setting that the distance from the center 32 to the farther edge 33 is L3, the ratio L2/L3 is to be obtained. The PC 19 calculates the maximum resolution capable of being indicated on the CRT frame by using this ratio, and indicates the result as 1500 dpi, for example, as is shown in FIG. 10(a).

According to this example of the embodiment, the area for trimming can be read with a maximum resolution, by calculating the magnification of trimming using the ratio of the half of the distance in the main scanning direction L2 to the distance from the central line in the main scanning direction 32 to the farther edge from said central line.

Further, in this case, when the area for trimming is specified, the PC 19 can calculate the maximum resolution or the quantity of the image data of the specified area for trimming and indicate the result on the CRT 20, which makes the image quality easy for the operator to understand.

Next, the PC 19 makes the optical system positioned for re-sizing by the varying means of resolution of the image to be read on the basis of the calculated resolution value. The PC 19 gives an instruction to the scan-starting position detecting circuit 17 to obtain the starting position in the sub-scanning direction from the range of the trimming specified on the CRT 20, and drives the sub-scan drive motor 4 by the sub-scan motor drive circuit 18 to set the original 1 at the scan-starting position. K1 in FIG. 11 is the starting position in the sub-scanning direction and K2 is the end position in the sub-scanning direction.

The total image information in the trimming area is read by sub-scanning from K1 to K2 in the sub-scanning direction and indicated on the CRT, with the width for reading in the main scanning direction in the proper scanning process made the range of the width in the main scanning direction specified for trimming on the CRT 20. FIG. 10(b) shows the image indicated with the maximum resolution on the CRT 20 after proper scanning. In this case, the quantity of the image data may be indicated instead of the maximum resolution, or it may be appropriate to indicate both of them.

According to this example of the embodiment, in the case where the area for trimming has been specified, it is not required to make proper scanning over the whole frame area, hence the proper scanning is carried out with a good efficiency by limiting the area for proper scanning to that from the start position in the sub-scanning direction to the end position in the sub-scanning direction.

Further, according to this example of the embodiment, the image for the trimming area only can be indicated with the maximum resolution on the CRT, because the proper scanning is made with the maximum resolution of the trimming area.

According to this invention, the optical system is set at the wide-angle position, and the pre-scanning is carried out, so that the operator may also specify the magnification for enlargement or the size of the original, while he is looking at the image indicated on the CRT 20. Further, when the operator specifies the magnification for enlargement or the-size of the original, the varying means of resolution of the image to be read scans the original so as to make the resolution the specified value, and it can also be done that the image read with the maximum magnification is indicated on the CRT 20. This example of the embodiment is suitable for being employed in the image reading apparatus of flatbed, original-reflected type.

According to this example of the embodiment, the image can be read with the magnification for enlargement or the size of the original as is just specified by the operator.

In the above-mentioned example of the embodiment, it is taken for instance the case where the image reading apparatus of original-transmitted type is employed, however, this invention should not be confined to this, and can be applied to the image reading apparatus of original-reflected type in quite the same manner.

Further, in the above-mentioned example of the embodiment, it is taken for instance the case where a developed photographic film is used for the original, however, this invention should not be confined to this, and can be applied to the other kinds of original. Especially, in the case of an image reading apparatus of flatbed type, the image information printed or hand-written on a sheet of paper can usually be read.

Furthermore, the photoelectric conversion element is not limited to the CCD that is employed in the examples of the embodiment, but other kinds of photoelectric conversion element can be employed. Also the display means is not limited to the CRT, but other devices, for example, such as a plasma display device and a liquid crystal display device can be employed.

Moreover, for the varying means of resolution of the image to be read, it may be appropriate to employ a CPU or a circuit which is specified in a manner such that the resolution of the image to be read is varied by deleting a part of the image information read by the photoelectric conversion element, not by varying the size of the image focused on the photoelectric conversion element.

In addition, in consideration of the resolution with which the display means and the printer etc. can output the image, it may also be appropriate that the varying means of resolution of the image to be read varies the resolution of the image to be read to the predetermined value in accordance with the image resolution of the output apparatus.

According to this invention, as is explained up to now, (1) In an image reading apparatus wherein the image information of an original is focused on a photoelectric conversion element through an optical system, and the image information is read by said image conversion element, by providing image size detecting-or-specifying means for detecting or specifying the image size to be read, and varying means of resolution of the image to be read for varying the maximum resolution of the image to be read in accordance with the output of said image size detecting-or-specifying means, the image size detecting-or-specifying means can detect the format size of the original set on the original setting portion or the operator can specify the format size of the original from the image size detecting-or-specifying means, hence the format size of the original is determined, and the varying means of the resolution of the image to be read makes it possible to read the image information with a maximum resolution at any time in accordance with the determined format size of the original.

(2) Owing to that the aforesaid varying means of resolution of the image to be read is a lens for re-sizing, the image can be read always with a maximum resolution by driving the lens for re-sizing in accordance with the format size of the original.

(3) Owing to that the aforesaid varying means of resolution of the image to be read is a single focus lens and a photoelectric conversion element which are made up in such a manner as to move for re-sizing with a predetermined relationship maintained, the image can be read always with a maximum resolution in accordance with the format size of the original, because the single focus lens and the photoelectric conversion element move for re-sizing with a predetermined relationship maintained.

(4) Owing to that the aforesaid varying means of resolution of the image to be read is a single focus lens and an original setting portion which are made up in such a manner as to move for re-sizing with a predetermined relationship maintained, the image can be read always with a maximum resolution in accordance with the format size of the original, because the single focus lens and the original setting portion move for re-sizing with a predetermined relationship maintained.

(5) Owing to that the aforesaid varying means of resolution of the image to be read is an original setting portion and a photoelectric conversion element which are made up in such a manner as to move for re-sizing with a predetermined relationship maintained, the image can be read always with a maximum resolution in accordance with the format size of the original, because the original setting portion and the photoelectric conversion element move for re-sizing with a predetermined relationship maintained.

(6) Owing to that the aforesaid varying means of resolution of the image to be read is made up in such a manner that there is provided an original setting portion capable of being selected stepwise and a photoelectric conversion element moves for re-sizing to make a predetermined magnification in accordance with the selected original setting portion, the image can be read with a maximum resolution at any time in accordance with the format size of the original, because the single focus lens is moved for re-sizing to make a predetermined magnification in accordance with the selected original setting portion.

(7) Owing to that the aforesaid varying means of the resolution of the read image is provided with an original setting portion capable of being selected stepwise, and has a structure such that the photoelectric conversion element is moved for re-sizing to make a predetermined magnification in accordance with the selected original setting portion, the image can be read always with a maximum resolution in accordance with the format size of the original, because the photoelectric conversion element is moved for re-sizing to make a predetermined magnification in accordance with the selected original setting portion.

(8) Owing to that the aforesaid image size detecting-or-specifying means detects the image size by detecting the image width in the main scanning direction focused on the photoelectric conversion element, the format size of the original can be detected, because the width of the image focused on the photoelectric conversion varies in accordance with the size of the original.

(9) Owing to that the aforesaid image size detecting-or-specifying means specifies the area for trimming on the image surface for the image indicated on a display means, a specified area of the image indicated on the display means can be denoted as the area for trimming, and the specified area for trimming can be read with a maximum resolution.

(10) Owing to that the magnification for trimming is calculated according to the ratio of the length of a half of the whole image length indicated on the display means in the main scanning direction to the distance from the edge farther from the central line with regard to the main scanning direction to said central line, the area for trimming can be read with a maximum resolution, by calculating the magnification for trimming according to the ratio of the half length of the image in the main scanning direction to the distance from the edge farther from the central line with regard to the main scanning direction to said central line.

(11) Owing to that, when the aforesaid image size detecting-or-specifying means specifies the area for trimming on the display means, the maximum image resolution or the quantity of the image data is indicated on the display means in accordance with the area for trimming, when the area for trimming is specified, the maximum resolution of the specified area for trimming can be calculated and indicated on the display means so that it may be easy to understand for the operator.

(12) Owing to that, when the scanning of the image wherein the area for trimming is specified on the display means is to be carried out, the start position in the sub-scanning direction and the end position in the sub-scanning direction are moved in accordance with the area for trimming, in the case where the area for trimming is specified, because it is not necessary for the whole area of a frame to be subjected to proper scanning, the area for proper scanning is made to be from the start position in the sub-scanning direction to the end position in the sub-scanning direction, hence the proper scanning can be carried out efficiently.

(13) Owing to that, when the image, in which the area for trimming is specified on the display means, is indicated again on the display means after it is subjected to the scanning, the scanned and read image is indicated only to the extent subjected to trimming, only the area subjected to trimming can be indicated with a maximum resolution on the display means.

(14) Owing to that the aforesaid image size detecting-or-specifying means indicates the magnification for enlargement or the size of the original on the display means, the image can be read with the magnification for enlargement or the size of original that is just specified by the operator.

(15) Owing to that the aforesaid image size detecting-or-specifying means detects the image size to be read by the original size detecting means provided in the original setting portion, the image size to be read can be detected by providing the means for detecting the size of the original in the original setting portion.

According to this invention, as is explained up to now, it is possible to provide an image reading apparatus that can read an image always with a maximum resolution by varying the image resolution in accordance with the size of the original.

Further, the disclosed embodiment can be varied by a skilled person without departing from the spirit and scope of the invention.

What is claimed is:

1. A film scanner for reading an original image on the photographic film, comprising:
   an optical system for irradiating light to the original image on the photographic film and for focusing light from the photographic film so as to form an image;
   photoelectrically converting elements for photoelectrically reading the formed image by the optical system; and
   image resolution regulating means for regulating image resolution of the read image in accordance with the size of the original image to be read,
   wherein the optical system comprises a photographic film setting section and a single focus lens and the image resolution regulating means controls the photographic film setting section and the single focus lens to be moved keeping a predetermined relationship so as to change a magnification.

2. The film scanner of claim 1, further comprising:
   detecting means for detecting the size of the original image to be read.

3. The film scanner of claim 2, wherein the detecting means detects the size of the original image by detecting a width of the formed image in terms of a main scanning direction.

4. The film scanner of claim 2, further comprising:
   a photographic film setting section on which the photographic film is set; wherein the detecting means is provided on the photographic film setting section, whereby the detecting means detects the size of the original image to be read by detecting the photographic film set on the photographic film setting section.

5. The film scanner of claim 1, further comprising:
   setting means for setting the size of the original image to be read.

6. The film scanner of claim 5, further comprising:
   a display for indicating an image to which a trimming region is designated, wherein the setting means sets the size of the original image on the basis of the trimming region.

7. The film scanner of claim 5, further comprising a display to indicate operation information;
   wherein the setting means sets the size of the original image to be read on the basis of one of a magnification and a size of film which are designated on the display.

8. The film scanner of claim 1, wherein the image resolution regulating means regulates the image resolution of the read image by controlling the optical system so as to change the size of the formed image on the photoelectically converting elements.

9. The film scanner of claim 1, wherein the image resolution regulating means regulates the image resolution of the read image so as to obtain a predetermined image resolution.

10. The film scanner of claim 1, wherein the optical system comprises a plurality of selectable photographic film setting sections and the image resolution regulating means control the optical system so as to make the formed image to have a predetermined magnification in accordance with a selected photographic film setting section.

11. A film scanner for reading an original image on a photographic film, comprising:
    an optical system for irradiating light to the original image on the photographic film and for focusing light from the photographic film so as to form an image;
    photoelectrically converting elements for photoelectrically reading the formed image by the optical system; and resolution of the read image in accordance with the size of the original image to be read,
    wherein the optical system comprises a photographic film setting section and the image resolution regulating means controls the photographic film setting section and the photoelectrically converting elements to be moved keeping a predetermined relationship so as to change a magnification.

12. A film scanner for reading an original image on a photographic film, comprising:

an optical system for irradiating light to the original image on the photographic film and for focusing light from the photographic film so as to form an image;

photoelectrically converting elements for photoelectrically reading the formed image by the optical system;

setting means for setting the size of the original image to be read;

image resolution regulating means for regulating image resolution of the read image in accordance with the size of the original image to be read, and a display for indicating an image to which a trimming region is designated, wherein the setting means sets the size of the original image on the basis of the trimming region;

wherein a trimming magnification is calculated from a ratio of a half of a length of all images indicated on the display in terms of the main scanning direction to a distance between the furthest edge of the image designated by the trimming region from the center line in terms of the main scanning direction and the center line of the main scanning direction.

13. The film scanner of claim 12, wherein when the size of the original image to be read is set based on the trimming region designated on the display, the film scanner outputs the largest image resolution or the largest image data amount in accordance with the trimming region.

14. The film scanner of claim 12, wherein when the image in the trimming region designated on the display is scanned, the start position in the sub-scanning direction and the end position in the sub-scanning direction are shifted in accordance with the trimming region.

15. The film scanner of claim 12, wherein after the image in the trimming region designated on the display is scanned, only the image in the trimming region is indicated when the image scanned on the display is indicated.

* * * * *